United States Patent [19]

Buisine et al.

[11] Patent Number: 5,242,757
[45] Date of Patent: Sep. 7, 1993

[54] POLYESTER FILMS, THEIR USE FOR OBTAINING COMPOSITE FILMS AND RESULTANT COMPOSITE FILMS

[75] Inventors: Abel Buisine, Miribel; Philippe Corsi; Marcel Eyraud, both of Lyons, all of France

[73] Assignee: Rhone-Poulenc Films, Courbevoie, France

[21] Appl. No.: 720,466
[22] PCT Filed: Dec. 27, 1989
[86] PCT No.: PCT/FR89/00683
§ 371 Date: Aug. 23, 1991
§ 102(e) Date: Aug. 23, 1991
[87] PCT Pub. No.: WO90/07543
PCT Pub. Date: Jul. 12, 1990

[30] Foreign Application Priority Data

Dec. 28, 1988 [FR] France ................ 88 17561

[51] Int. Cl.$^5$ .............................................. B32B 27/06
[52] U.S. Cl. ............................ 428/480; 156/244.11; 156/247; 156/344; 427/171; 428/483; 428/910
[58] Field of Search ............... 428/480, 483, 910; 156/244.11, 247, 344; 427/171

[56] References Cited

U.S. PATENT DOCUMENTS

| 4,058,647 | 11/1977 | Inoue et al. | 428/474 |
| 4,343,851 | 8/1982 | Sheptak | 428/212 |
| 4,677,188 | 6/1987 | Utsumi et al. | 528/272 |
| 4,708,902 | 11/1987 | Utsumi et al. | 428/141 |
| 4,997,707 | 3/1991 | Otawa et al. | 428/319.3 |
| 5,087,526 | 2/1992 | Tomitaka et al. | 428/480 |
| 5,156,904 | 10/1992 | Rice et al. | 428/219 |

FOREIGN PATENT DOCUMENTS 2177045 1/1987 United Kingdom .

Primary Examiner—Paul J. Thibodeau
Assistant Examiner—Hoa T. Le
Attorney, Agent, or Firm—Burns, Doane, Swecker & Mathis

[57] ABSTRACT

Orientated semi-crystalline polyester films characterized in that they have a planar orientation coefficient $\Delta p$ of greater than or equal to $165 \times 10^{-3}$ and a degree of transverse shrinkage of less than or equal to 2.7% at 200° C.

These films are suitable as a support for obtaining composite films by extrusion-coating of an olefin polymer.

11 Claims, No Drawings

POLYESTER FILMS, THEIR USE FOR OBTAINING COMPOSITE FILMS AND RESULTANT COMPOSITE FILMS

The present invention relates to novel polyester films which can be used, in particular, for the preparation, by extrusion coating, of composite films containing a layer of an olefin polymer on at least one of the sides of the polyester film and to the composite films resulting therefrom.

The composite films containing a layer of oriented semi-crystalline polyester and, on at least one side, a layer of an olefin polymer, and in particular of polyethylene, are used in the packaging sector as sealing tape to ensure the leaktightness of numerous recipients intended to contain liquids (milk, fruit juice, wines). The process for the production of these composite films which industrially is the most advantageous consists in carrying out the extrusion of a molten olefin polymer on at least one side of an orientated semi-crystalline polyester film, separating close to the extrusion die for the olefin polymer; this process is generally denoted by the term "extrusion-coating process". The composite film which results from the deposition of the olefin polymer on the polyester support is then cooled, for example by placing the polyolefin side against the surface of a cooling drum. In order to obtain composite films carrying a polyolefin coating on each side of the polyester film support, hereinafter termed "double-sided layered composite films", the complex film resulting from the first step of extrusion-coating is subjected, after cooling, to a repeat identical operation on the non-coated side of the polyester.

In spite of the advantage which it shows, the extrusion-coating process suffers from the drawback of leading to composite films having various anomalies with respect to the olefin polymer/polyester support bond. Thus, it has been found that the delaminating force (that is to say the force necessary to break the bond between the polyolefin coating and the support film) varies, during delaminating, between extreme values on either side of a mean value. This fluctuation in the delaminating force makes its determination uncertain and imprecise and is prejudicial to the industrial and commercial advantage of composite films. It has been found that it can affect the two layers of polyolefin coating when the support film has been the subject of a double extrusion-coating and that it can manifest itself whatever the mean value of the delaminating force.

The studies carried out by the Applicant have also enabled it to be shown that in the case of polyester support films subjected to a double extrusion-coating the delaminating force of the layer resulting from the second extrusion-coating is lower than the delaminating force of the polyolefin layer provided on the other side of the polyester film du ring the first extrusion-coating stage and can assume values less than the minimum value demanded for certain applications in the packaging sector, that is to say a value of less than 200 g/10 mm.

Without the present invention being limited by the explanation of the cause of these anomalies, it would appear that they are caused by the thermal shock to which the polyester support is subjected during the extrusion-coating. In fact, during the production of the polyolefin coating the polyester support film is brought into contact with the olefin polymer brought to a temperature of the order of 280° to 330° C., as a function of the nature of the latter and/or the extrusion-coating conditions, and is then cooled to ambient temperature. Where relevant, the polyester support film is subjected to a second thermal shock during the production of another polyolefin coating on its second side. The sudden rise in the temperature of the film can cause modifications in its structure which could be the origin of the anomalies found. In particular, it would appear that the rapid and more or less significant fluctuations in the delaminating force are due to a variation in the dimensions of the support film at a temperature greater than 200° C. and in particular to a too substantial transverse shrinkage at this temperature.

The problem was thus to provide the industry with a semi-crystalline oriented polyester film which is capable of being used to obtain composite films by extrusion-coating of polyolefin polymers without the abovementioned drawbacks and the present invention is proposed specifically to provide a solution to this problem.

A first objective pursued by the present invention resides in the solution to the problem posed by the significant and rapid variation in the delaminating force of the polyolefin coating during delaminating.

A second objective pursued by the present invention resides in the solution to the problem posed by the low value of the delaminating force of the second polyolefin coating produced on a polyester support film by extrusion-coating.

More specifically, the present invention relates to oriented semi-crystalline polyester films which can be used, in particular, to produce composite films by extrusion-coating of olefin polymers, characterized in that they have a planar orientation coefficient $\Delta p$ of greater than or equal to $165 \times 10^{-1}$ and a degree of transverse shrinkage at 200° C. of less than or equal to 2.7%.

It has been found, surprisingly, that polyester films having a degree of transverse shrinkage of less than or equal to 2.7% and preferably of less than or equal to 2.6% virtually no longer give rise to the phenomenon of rapid fluctuation in the delaminating force of the layer or layers of polyolefin coating, or give rise to this phenomenon only with a low amplitude, and that polyester films having a planar orientation coefficient $\Delta p$ of greater than or equal to $165 \times 10^{-1}$ exhibit a high value of the delaminating force of the polyolefin coating layer deposited on its second side during a double-sided extrusion-coating. In particular, polyester support films according to the invention enable composite films to be obtained which have at least one polyolefin coating for which the fluctuation in the delaminating force is less than or equal to 20%, preferably 15% and still more preferentially 5% on either side of its mean value and for which the mean value of the delaminating force of the second polyolefin coating layer in the case of a double-sided extrusion-coating is greater than or equal to 200 g/10 mm.

In the context of the present invention, the degree of transverse heat shrinkage denotes the variation in the dimension of the film in the direction perpendicular to the direction of longitudinal stretching, relative to its initial dimension, at the temperature of 200° C.

The planar orientation of the film denotes the orientation of the benzene rings present in the polyester chains relative to the plane of the film. The planar orientation of a film is expressed by means of the planar orientation coefficient in accordance with the equation:

$$\Delta p = \frac{n1 + n2}{2} - n3 \quad (1)$$

in which:

n1 is the refractive index in the main direction of orientation;

n2 is the refractive index in a direction perpendicular to the main direction of orientation, in the plane of the film; and n3 is the refractive index according to a direction perpendicular to the plane of the film.

The refractive indices n1, n2 and n3 are measured for the yellow line of sodium ($\lambda = 0.59 \times 10^{-3}$ mm).

There is no upper critical value for the planar orientation coefficient, which can assume any value compatible with the attainment of the technical objectives. Similarly, there is no critical value for the degree of transverse shrinkage.

The application GB-A-2.177.045 describes transparent and slippering polyester films meant for photography and photogravure, which have notably a planar orientation coefficient in the range of 0.155 to 0.165. This application does not mention the requirement of providing to the described films a determined value for their degree of transverse shrinkage, while this application does refer to a relaxation treatment of double-shrinked film during the coating process. Considering the planar orientation coefficient value and the recommended conditions for the relaxation treatment, this application could not suggest films having simultaneously a planar degree of orientation $\Delta p$ greater than or equal to 0.165 and a degree of transverse shrinkage at 200° C. less than or equal to 2.7%.

The polyesters used to obtain support films according to the invention are those which are customarily used for the preparation of films. They are film-forming linear polyesters crystallizable by orientation and obtained in the customary manner from one or more aromatic dicarboxylic acids or their derivatives (esters of lower aliphatic alcohols, for example halides) and one or more aliphatic glycols. The following may be mentioned as examples of aromatic diacids: phthalic, terephthalic, isophthalic, naphthalene-2,5-dicarboxylic and naphthalene-2,6-dicarboxylic acids. These acids can be combined with a minor amount of one or more aliphatic dicarboxylic acids, such as the adipic acids, azelaic acid or hexahydroterephthalic acid. Non-limiting examples of aliphatic diols which may be mentioned are ethylene glycol; propane-1,3-diol and butane-1,4-diol. These diols can be combined with a minor amount of one or more aliphatic diols containing more carbon atoms (neopentyl glycol for example) or cycloaliphatic diols (cyclohexanedimethanol). Preferentially, the crystallizable film-forming polyesters are polyterephthalates of alkylene diols and, in particular, the polyterephthalates of ethylene glycol (PET) or of butane-1,4-diol, or copolyesters containing at least 80 mole % of alkylene glycol terephthalate units. Advantageously, the polyester is a polyterephthalate of ethylene glycol having an intrinsic viscosity measured at 25° C. in o-chlorophenol of between 0.6 and 0.75 dl/g.

The semi-crystalline oriented polyester films according to the present invention can be obtained by the conventional processes for film production. Thus, the amorphous polyester film resulting from the extrusion is subjected at least to a monodirectional stretching intended to confer upon it a satisfactory spectrum of mechanical properties, and preferably to a biaxial stretching carried out in two orthogonal directions. In the latter case, the stretchings can be simultaneous or successive. The stretching or stretchings can be carried out in a single step or in several steps until the desired degree of stretching is obtained. Preferentially, the amorphous film is subjected to a transverse stretching (direction perpendicular to the direction of the machine), it being possible for the longitudinal stretching to precede the transverse stretching (sequence termed normal) or to follow the latter (sequence termed reverse).

In general the degree of longitudinal stretching is between 3 and 5% and the temperature is between 80° and 120° C.; the transverse stretching is carried out to a degree of 3 to 5% and at a temperature of 90° to 120° C.

The stretched film is then subjected to a heat stabilization at a temperature of between 200° and 240° C.

The production of polyester films according to the invention having the $\Delta p$ and transverse shrinkage characteristics defined above depends on the choice of the film production conditions within the general framework described above: degrees of stretching, stretching temperatures, heat stabilization temperature.

Thus, in general, it has been found that the $\Delta p$ increases when the degrees of stretching in the longitudinal direction and in the transverse direction increase, all other conditions otherwise being kept constant. Conversely, for given degrees of stretching and a given heat stabilization temperature, the $\Delta p$ increases when the stretching temperatures decrease. Finally the degrees of stretching and the stretching temperatures being fixed, it has been found that $\Delta p$ increases substantially when the heat stabilization temperature increases up to a value which is characteristic for each polyester and then decrease beyond this value. Thus, in the case of a polyterephthalate of ethylene glycol, the $\Delta p$ increases with the increase in the heat stabilization temperature up to 200° to 210° C. and decreases beyond this.

With regard to the transverse shrinkage, it is well-known to those skilled in the art that this decreases as the heat stabilization temperature increases. Thus, in order to obtain shrinkages which are as low as possible, it is preferable to carry out the heat stabilization of the film at temperatures which are as high as possible and, in particular, higher than 210° C. It is thus established that the heat stabilization conditions leading to a high $\Delta p$ and to a low degree of shrinkage are incompatible. However, the choice of a heat stabilization temperature enabling a high $\Delta p$ to be obtained can be compensated for by a relaxation treatment of the film after heat stabilization which enables the stability of the oriented films to be increased (cf. British Patent GB 1,000,361 for example). The relaxation treatment consists in subjecting the biaxially oriented film to a heat treatment while progressively reducing the tension to which it is subjected. The temperature, time and tension value conditions depend on the conditions of film production and must be determined in each particular case in order to obtain the desired degree of shrinkage. The relaxation treatment of the film can cause a slight lowering in the $\Delta p$ and the relaxation conditions must likewise be chosen so as to obtain the best possible compromise between the $\Delta p$ and the degree of shrinkage.

In short, the production of polyester films according to the present invention passes through the selection of the stretching, heat stabilization and relaxation conditions, taking account of the nature of the polyester. It is within the understanding of those skilled in the art to make this selection without it being necessary to add additional information to that given above.

The polyester subjected to the film production can contain the adjuvants customarily used to obtain films. These can be fillers, antistatic agents and stabilizers, for example.

The polyester films according to the present invention can be provided on at least one of their sides with a primer coating intended to improve the adhesion of final coatings applied, and in particular polyolefin coatings. The adhesion-promoting primer coatings can be chosen from those used to this end. Examples which may be mentioned are the coatings based on acrylic polymers, such as those described in French Patent No. 1,428,831 and British Patent No. 1,075,533, the sulphonated copolyesters, such as those described in French Patents Nos. 1,401,581 and 1,602,002 and American Patent No. 4,476,189, and the graft copolymers of sulphonated copolyesters and acrylic monomers, such as those described in European Application EP 0,260,203. These primer coatings are deposited on the films according to the invention in the form of aqueous solutions or dispersions or of organic solutions, either in line (coating before stretching or between stretchings) or in a subsequent stage (after heat stabilization). In the case where the polyester support films according to the invention are intended for extrusion-coating with olefin polymers, use is made of primers and/or one-component or two TM component adhesives based on polyurethanes. The improvement in the adhesion properties of the films according to the present invention ca also be obtained by treating the surface of the film by means of electric discharges (corona treatment) or by plasma. These treatments can also be combined with the deposition of an adhesion-promoting primer coating such as those mentioned above.

Although the polyester films according to the present invention are suitable for numerous applications, they are most particularly well suited for obtaining composite films containing a layer of a film-forming polymer, and in particular of an olefin polymer, on at least one of their sides, by the extrusion-coating process. Consequently, the second object of the present invention is composite films consisting of a semi-crystalline, oriented polyester support film carrying, on at least one of its sides, an olefin polymer coating deposited by extrusion-coating, characterized in that the polyester support film has a planar degree of orientation $\Delta p$ greater than or equal to $165 \times 10^{-3}$ and a degree of transverse shrinkage at 200° C. of less than or equal to 2.7%.

The polyester/polyolefin composite films according to the present invention are obtained by extrusion-coating of a polyolefin polymer on the polyester support film according to the customary processes well-known to those skilled in the art, cf.: Kirk-Othmer Encyclopedia of Chemical Technology—vol. 6, page 421–422, 3rd edition; ibid. vol. 10, page 237; Allan R. GRIFF—Plastics Extrusion Technology (1962) p. 113 to 123: O.J. SWEETING—The Science and Technology of Polymer Films—vol. 1 (1968), pages 496 to 499. According to this process, a molten olefin polymer is extruded through a slit die in the form of a sheet brought to a temperature of between 280° and 330° C. (preferably between 300° and 320° C.): this sheet is deposited on the polyester support film according to the invention, which may have been preheated to a temperature of between 70° and 150° C., breaking off continuously in the vicinity of the die. The complex made up in this way is laid against the surface of a metallic cooling drum by means of a pressure roller covered with a layer of elastomer, the polyolefin layer being in contact with the cooling drum maintained by any appropriate means at a temperature sufficiently low to bring the temperature of the polyolefin layer to a value of between 40° and 60° C. The composite film thus obtained can be subjected to a second extrusion-coating operation intended to produce another layer of polyolefin polymer on the second side of the polyester support. Before passing into the extrusion TM coating zone, the polyester support film is preferably subjected to the customary treatments intended to improve the bond between the polyester film and the layers of polyolefin coating. Thus, it can be subjected to a corona treatment and/or to the deposition of an adhesion-promoting primer coating and/or of an adhesive layer by the customary coating processes. To this end, organic solutions (for example in aliphatic esters or ketones) of polymers such as the polyurethanes or polyethyleneimines can be used. The coated polyester support film is then dried to evaporate the solvent or solvents and, if appropriate, preheated.

The speed at which the polyester support film passes through the extrusion-coating process is generally between 100 and 240 m/min. The amount of olefin polymer deposited on the side or sides of the support film is calculated so that the final thickness of the coating will be between 5 and 40 $\mu$m (preferably between 5 and 30 $\mu$m). The thickness of the polyester support film is in general between 5 $\mu$m and 50 $\mu$m and preferably between 8 $\mu$m and 40 $\mu$m.

In the case where a second polyolefin coating is produced on the second side of the polyester support film, the second extrusion-coating operation can be carried out immediately after the first or after the composite film resulting from the first extrusion-coating operation has rested for a period which is suited to each particular case. In general it is not necessary for this rest stage to exceed fifteen days.

The olefin polymers which can be used to obtain the composite films according to the invention are those customarily used for the production of composite films with a polyester support which are intended for packaging. They are, essentially, polymers and copolymers derived from $\alpha$-olefins and in particular high or low density polymers and copolymers of ethylene and of propylene. It would also be possible, without going beyond the scope of the present invention, to use polyionomers consisting of ethylene polymers having metal carboxylate groups, such as those sold under the trade name SURLYN A.

The examples which follow illustrate the invention and show how it can be implemented. The tests described below were used in the examples.

1) Measurement of the Heat Shrinkage

Circular test pieces with a diameter of 100 mm are cut from a polyester film after marking the transverse stretching direction and the longitudinal stretching direction of the film. The test pieces are then brought to 200° C. for 30 min in a thermostat-controlled ventilated oven. After cooling, the diameters of the test pieces are determined in the transverse direction (TD) and in the longitudinal direction (LD) by means of a measurement block consisting of a measurement scale graduated in 0.1 mm engraved on a sheet of illuminated glass and an eyepiece. The shrinkage is expressed and calculated by means of the equations:

$TS = 100 - TD$ $LS = 100 - LD$

2) Measurement of the Delaminating Force 30 cm × 1 cm samples of composite films are taken at the outlet of the extrusion-coating device at the centre of the sheet such that their length is parallel to the longitudinal axis of the film. A delaminating leader is immediately produced over a length of 4 cm in such a way as to separate the coating layer or layers from the polyester film. The samples are then kept for a time sufficient to allow crosslinking of the adhesive and consequently its optimum setting. The delaminating force is then measured by introducing the leaders into the jaws of a dynamometer of the INSTRON trade name, the speed of delaminating being 200 m/min. The apparatus records a plot of the force necessary to separate the layers during delaminating. The delaminating force is expressed in g/cm.

In the examples below the measurements of the $\Delta p$, the shrinkage and the delaminating force were always carried out in the same zone of the width of the sheet of film (at the centre) to eliminate the variations which could be due to slight irregularities in thickness or properties from one side of the sheet to the other.

EXAMPLE 1

1) Preparation of the Polyester Support Film

The extrusion of a polyterephthalate of ethylene glycol (PET) having an intrinsic viscosity of 0.62 dl/g and containing 0.07% by weight of silica particles with a median diameter of 1 μ (trade name SYLOID) and 0.04% by weight of calcium carbonate particles having a median diameter of 0.7 μm was carried out in a known manner at a rate of 1000 kg/h to produce an amorphous film. The amorphous film was cooled to 30° C. on a cooling drum and then stretched, first in the longitudinal direction to a degree of 3.5 % at 110° C., and then in the transverse direction to a degree of 4.05% and at a temperature ranging from 115° C. (start of stretching) to 120° C. (end of stretching). The bidirectionally stretched film is then subjected to heat stabilization in an oven in which the three zones are brought, respectively, to 200° C., 230° C. and 235° C.; the total duration of the heat treatment being 3 seconds; then to a transverse relaxation causing a total reduction in its width of 3%. This relaxation was carried out in the course of 2 seconds during the cooling of the film.

In this way a PET film having the following characteristics:

| thickness | 12 μm |
|---|---|
| $\Delta p$ | $165 \times 10^{-3}$ |
| transverse shrinkage at 200° C. | 2.6% | is obtained at a speed of 190 m/min.

2) Preparation of a Composite Film

Using a conventional apparatus for extrusion-coating of polyethylene (PE) on a support, analogous to that shown diagrammatically in Encyclopedia of Chemical Technology Vol. 10, page 238, 3rd edition, extrusion-coating of a low density polyethylene (d=0.915) having a melting point of 290° to 335° C. was carried out. The sheet of extruded polyethylene leaving the die at a temperature of 305° C. and at a speed of 130 m/min is brought into contact, in the vicinity of the cooling drum, with the polyester film previously obtained, on which an adhesion-promoting primer sold under the trade name ADCOTE 329 by the company MORTON has been deposited by coating, after corona treatment. The polyester film is then dried to evaporate the solvent and preheated to 70° C. The mono-layer composite film thus obtained is wound on a spool after cutting off the edges and then stored at 20° C. for 5 days in order to allow the adhesive to set. The other side of the composite film is then subjected to a second extrusion-coating stage under the same conditions. In this way a PE/PET/PE composite film is obtained in which the PE layers have a thickness of 25 μm.

The determination of the delaminating force on test pieces prepared as has been described above gave the following values:

mean delaminating force: 200 g/cm for each side variation in the delaminating force: ±15% to either side of the mean delaminating force.

For comparison, a PET film having a $\Delta p = 164 \times 10^{-3}$ and a degree of transverse shrinkage at 200° C. of 4% was prepared under the conditions described above, the temperature in the 3rd heat stabilization zone being 230° C. and the degree of transverse relaxation being 2.5%. The PE/PET/PE composite films obtained as above have a mean delaminating force for the second side of 100 g/cm and a fluctuation of ±50% of this value to either side of the mean value.

EXAMPLES 2 AND 3

PET films were prepared using the procedure of Example 1 under the conditions given in the following table and then PE/PET/PE composite films, on which the delaminating forces were determined. The results obtained are given in the table below.

TABLE

| EX | DLS % (1) | DTS % (2) | Θ HEAT STABILIZATION °C. | | | Degree of transverse relaxation | $\Delta p$ | Transverse shrinkage at 200° C. % | Fd (3) g/cm | ΔFd (4) % |
|---|---|---|---|---|---|---|---|---|---|---|
| | | | 1st zone | 2nd zone | 3rd zone | | | | | |
| 2 | 3.35 | 3.9 | 200 | 230 | 235 | 3.5 | $167 \times 10^{-3}$ | 1.7 | 250 | ±5 |
| 3 | 3.5 | 4.05 | 200 | 230 | 235 | 4% | $165 \times 10^{-3}$ | 1.7 | 200 | ±5 |

(1) Degree of longitudinal stretching
(2) Degree of transverse stretching
(3) Mean delaminating force for each side
(4) Fluctuation in the delaminating force for each side

I claim:

1. A composite film comprising an oriented semi-crystalline polyester film having a layer of olefin polymer laminated on at least one side thereof wherein the polyester film has a planar orientation coefficient $\Delta p$ which is greater than or equal to 0.165 and a degree of transverse shrinkage which is less than or equal to 2.7% at 200° C.

2. The composite of claim 1 wherein the olefin polymer layer is deposited by extrusion coating.

3. The composite film according to claim 1 wherein the mean value of the force required to delaminate the polyester film and the olefin polymer layer is greater than or equal to 200 g/cm.

4. The composite according to claim 3 wherein the fluctuation of said force from the mean value is ±20% during delamination.

5. The composite according to claim 4 wherein the fluctuation of said force from the mean value is ±5% during delamination.

6. The composite film according to claim 1 wherein the thickness of the olefin polymer layer is between 5 and 40 microns and the polyester film has a thickness of between 5 and 50 microns.

7. The composite film according to claim 1 wherein the polyester film comprises a polyester containing at least 80 mol % of alkylene glycol terephthalate units.

8. The composite film according to claim 1 wherein the olefin polymer comprises a polyethylene.

9. A composite film according to claim 1 wherein an olefin polymer film is deposited on both sides of the polyester film.

10. A process for producing a composite film comprising laminating a layer of olefin polymer on at least one side of an oriented semi-crystalline polyester support film by extrusion-coating, wherein the support film has a planar orientation coefficient $\Delta p$ which is greater than or equal to 0.165 and a degree of transfer shrinkage which is less than or equal to 2.7% at 200° C.

11. A process according to claim 10 wherein the layer of olefin polymer is deposited on both sides of the polyester support film.

* * * * *